No. 609,834. Patented Aug. 30, 1898.
C. E. ROBERTS.
DRIVE WHEEL FOR MOTOR CYCLES.
(Application filed Jan. 28, 1898.)
(No Model.)
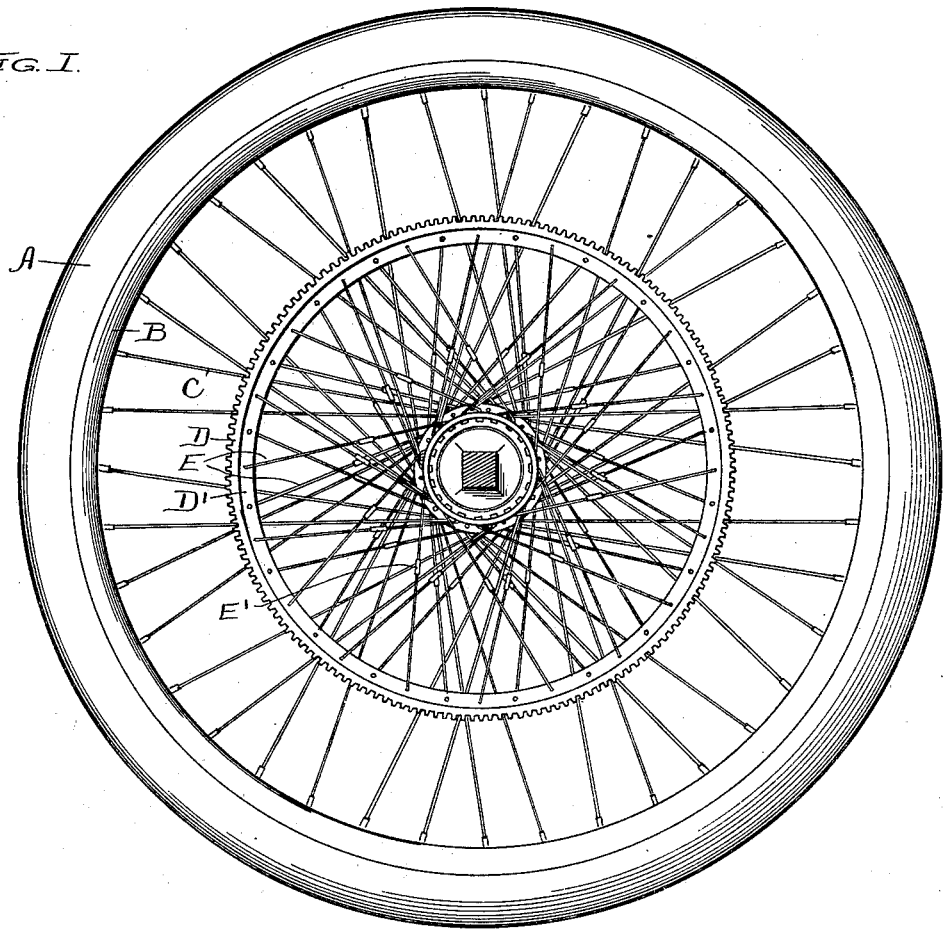
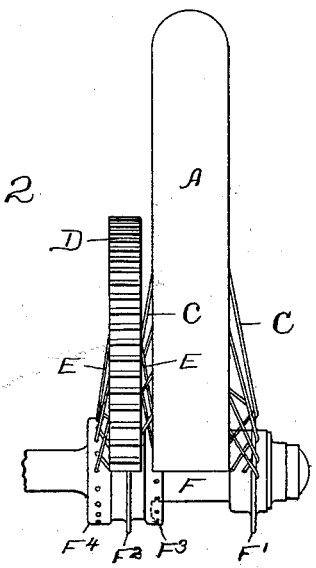
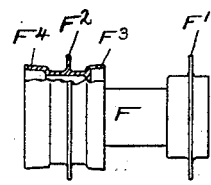
WITNESSES:
INVENTOR:
CHARLES E. ROBERTS
BY Munday, Evarts & Adcock
HIS ATTORNEYS

UNITED STATES PATENT OFFICE.

CHARLES E. ROBERTS, OF OAK PARK, ILLINOIS.

DRIVE-WHEEL FOR MOTOR-CYCLES.

SPECIFICATION forming part of Letters Patent No. 609,834, dated August 30, 1898.

Application filed January 28, 1898. Serial No. 668,335. (No model.)

*To all whom it may concern:*

Be it known that I, CHARLES E. ROBERTS, a citizen of the United States, residing in Oak Park, in the county of Cook and State of Illinois, have invented a new and useful Improvement in Drive-Wheels for Motor-Cycles, of which the following is a specification.

This invention relates to the construction of the drive-wheels employed in motor-cycles, and has for its object the production of a very strong and light wheel, combining in one structure both the supporting-wheel and the gear by which it is actuated.

The invention consists in the novel features of construction and in the novel combinations of parts and devices hereinafter set forth.

In the accompanying drawings, forming a part of this specification, Figure 1 is a side elevation of my improved wheel. Fig. 2 is a partial edge view, the rim, gear, and spokes being omitted in a portion of the figure. Fig. 3 is a partial longitudinal section of the hub.

In said drawings, A represents the tire, B the rim, and C the spokes, of the suspension-spoke supporting-wheel for motor-cycles.

D is the toothed rim of driving-gear for actuating the supporting-wheel, and it also is supported by suspension-spokes E, attached to inward flanges D' in order to lighten it as much as possible. Both the supporting and the gear wheels are attached to the same hub F, which is provided with vertical flanges F' and F² to receive the spokes C of the former and with overhanging horizontal flanges F³ and F⁴ to receive the spokes E of the latter. The flange F² is located between flanges F³ and F⁴, as plainly shown, and consequently the spokes C, attached to it, must pass between the spokes E, attached to flange F³. All the spokes are arranged tangentially, as shown, and the spokes E are made in two parts and united by the turnbuckles E', whereby they may be brought to the proper tension, this feature being rendered necessary by the fact that the usual adjusting-nuts cannot well be used at the ends of the spokes E. With spokes C, however, the turnbuckles are unnecessary.

By the construction detailed I produce a very compact combined supporting and driving gear-wheel of great strength, of little weight, and of very pleasing appearance.

I claim—

1. The supporting and gear wheels, having a single hub provided with vertical flanges for the attachment of the spokes of one wheel, and overhanging flanges for the attachment of the spokes of the other wheel, substantially as specified.

2. The gear and supporting wheels, each having its own suspension-spokes, and both employing the same hub, said hub having separate flanges to receive the spokes of each wheel, and those for one of the wheels projecting horizontally, substantially as set forth.

3. The combination with the supporting and gear wheels shown, of a hub F having overhanging flanges F³ and F⁴ for the attachment of the spokes of the gear-wheel, and other means for the attachment of the spokes of the supporting-wheel, substantially as specified.

4. A combined supporting-wheel and actuating-gear therefor, both provided with tension-spokes, and the gear being united to the wheel by connecting its spokes to the hub of the wheel, substantially as specified.

5. A suspension-spoke supporting-wheel in combination with a suspension-spoke gear for driving said wheel, the spokes of both being joined to the same hub, and the spokes of the gear having adjusting-turnbuckles, substantially as specified.

CHARLES E. ROBERTS.

Witnesses:
    EDW. S. EVARTS,
    H. M. MUNDAY.